United States Patent [19]

Zabcik

[11] Patent Number: 4,518,888

[45] Date of Patent: May 21, 1985

[54] DOWNHOLE APPARATUS FOR ABSORBING VIBRATORY ENERGY TO GENERATE ELECTRICAL POWER

[75] Inventor: Clarence J. Zabcik, Houston, Tex.

[73] Assignee: NL Industries, Inc., New York, N.Y.

[21] Appl. No.: 453,333

[22] Filed: Dec. 27, 1982

[51] Int. Cl.³ .................... G01V 1/40; E21B 17/07
[52] U.S. Cl. .................................. 310/334; 175/50; 310/87; 464/20
[58] Field of Search ............... 290/53, 42, 1; 310/322, 310/339, 87, 328, 334; 322/35, 61; 416/500; 464/20; 175/40, 48, 50, 104, 57

[56] References Cited

U.S. PATENT DOCUMENTS

| | | | |
|---|---|---|---|
| 3,090,031 | 5/1963 | Lord | 340/854 |
| 3,506,076 | 4/1970 | Angona | 175/104 |
| 3,559,027 | 1/1971 | Arsem | 290/1 R |
| 3,930,220 | 12/1975 | Shawhan | 367/82 |
| 3,970,877 | 7/1976 | Russel et al. | 310/339 |
| 4,011,474 | 3/1977 | O'Neill | 310/369 |
| 4,110,630 | 8/1978 | Hendel | 290/53 |
| 4,246,765 | 1/1981 | Zabcik | 464/20 |
| 4,283,780 | 8/1981 | Nardi | 367/82 |

Primary Examiner—William H. Beha, Jr.
Assistant Examiner—D. L. Rebsch
Attorney, Agent, or Firm—Browning, Bushman, Zamecki & Anderson

[57] ABSTRACT

In a drilling operation fatique producing vibrational motion is produced in the drill string in the form of longitudinal and torsional load variations at the drill bit and throughout the bottom hole assembly. These load variations occur at least partially as a result of the irregularly shaped hole bottom which develops beneath the bit and which in turn cause the bit to rise and fall with rotation, and the bit loading to vary. In addition, the rotating drill string causes gyrations in the drill string which are transmitted to the bottom end of the drill string and drill bit in the form of load and torque variations. These variations in loading appear as longitudinal and torsional vibrations in the drill string. A dampening and shock absorbing mechanism is at least partially comprised of piezoelectric elements which are responsive to the vibrations of the drill string to produce electrical energy which is used to operate downhole electrical circuits.

22 Claims, 5 Drawing Figures

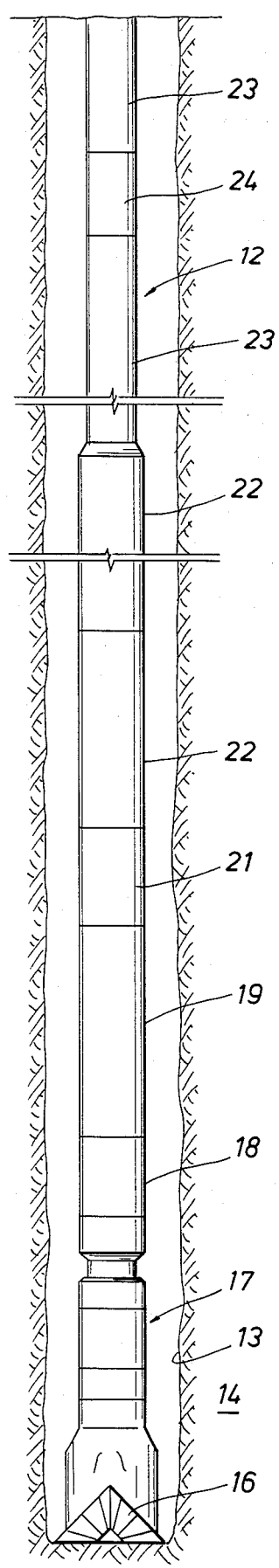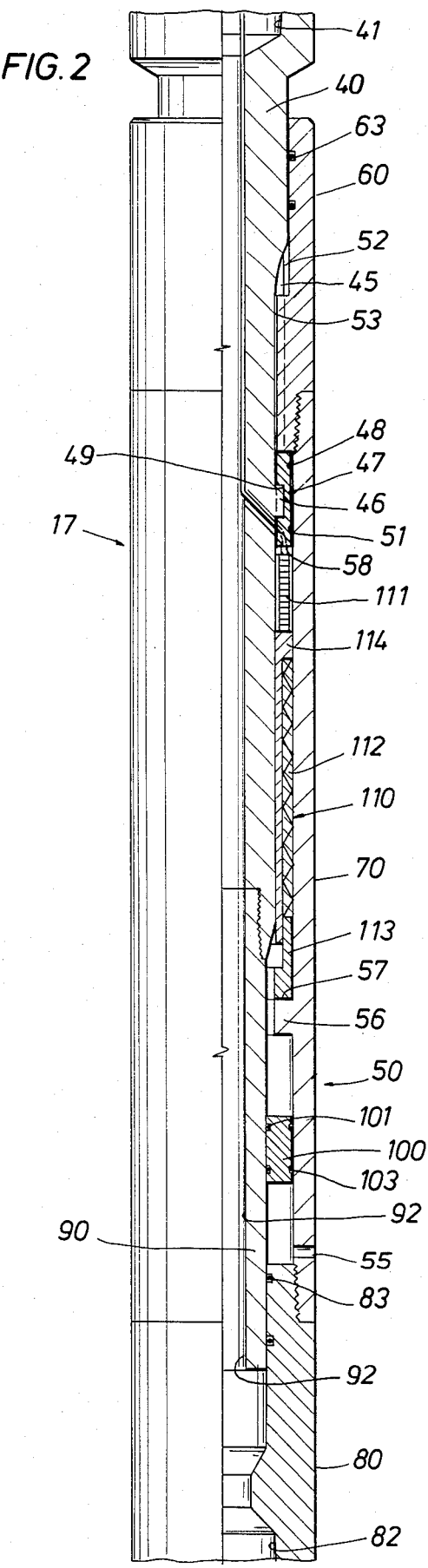

DOWNHOLE APPARATUS FOR ABSORBING VIBRATORY ENERGY TO GENERATE ELECTRICAL POWER

BACKGROUND OF THE INVENTION

The present invention pertains to a downhole energy absorbing system for generation of electrical power, and more particularly to an apparatus for absorbing at least a portion of the vibrational energy from a drill string and converting such vibrational energy into electrical energy.

The problem of developing effective downhole electrical power supplies has existed in the mining and petroleum industries since the advent of downhole electrically operated devices. To a great extent, the development of electrically operated downhole equipment has been stymied by the lack of an effective power supply which will operate within the restrictive limitations of the downhole environment. In the past, great reliance has been placed on batteries for downhole power but the environment of a wellbore, particularly with respect to high temperatures and pressures, as well as space limitations, all mitigate against the use of batteries, especially where sustained power is required. As a result of the ineffectiveness of battery power for many such operations, most measuring techniques, especially during drilling operations, require the cessation of drilling while electrically operated apparatus is lowered into the borehole on an armored cable having one or more electrical conductors.

With the advent of deeper drilling and increased drilling activity offshore and in hostile surface environments, the costs of drilling have escalated substantially. Therefore, any operation which requires the cessation of drilling in order to be performed, such as lowering a cable into the borehole, is done at a great expense. In addition, because of the great expense of present drilling operations, the need has increased for obtaining real time data concerning downhole conditions, while drilling is progressing.

As a result, a great deal of development activity in the petroleum industry has been directed toward various telemetry systems for transmitting downhole data, relating to parameters measured while drilling, to the surface. Except for special circumstances, current methods of transmitting real time data in measure-while-drilling (MWD) systems have been marginally effective. Examples of important measurements to be made during drilling include rotation rate, penetration rate, torque, borehole fluid invasion, bit wear, formation parameters, etc. Presently in commercial use are mud pulse systems for telemetering data from the bit vicinity to the surface; however, these systems are expensive to use and have a low data rate.

There are basically four types of systems which show promise as communication and transmission systems in a borehole telemetry system. These are mud pressure pulse systems (mentioned above), electromagnetic methods, insulated conductor or hardwire systems, and acoustic methods. Developments in the last three methods have indicated the need to provide repeaters in the system in order to boost the signal as it is attenuated over a long and sometimes resistive conductor path. It appears that acoustic signals for example may travel effectively, under general drilling conditions, for 2 or 3 thousand feet before they are attentuated to unusable levels. The same is true of electromagnetic schemes. A hardwire system disclosed in U.S. Pat. No. 3,090,031 uses induction coupling between joints of pipe and electronic circuitry which necessitates the use of power sources at each coupling. In all of the proposed systems, excepting perhaps the mud pulse system, electrical power generation downhole to operate downhole circuits, including repeaters, presents a particularly difficult problem. The disadvantages of batteries have been discussed above. Present downhole generators typically rely on impellers or turbines stationed in the mud flow path to develop power. This tends to obstruct the full open bore in the pipe string, which may impede the insertion of equipment into the borehole through the drill pipe. In addition, such generators are adversely affected by the abrasive nature of drilling fluids which tend to wear flow channels and blades typically used in such devices and to damage bearings or the like.

In addition to the problem of effectively generating electrical power downhole in MWD systems, the vibrational environment afforded by the drill string is particularly harmful to electrical and mechanical hardwire systems associated with the measuring and telemetering of measured data to the surface in a drilling operation. As the formation is being drilled, an irregularly shaped hole bottom develops which causes the bit to rise and fall with rotation of the bit. This in turn causes the bit loading to vary. The variable load at the bit may be caused by other factors also. Thus conditions exist downhole which make the bit produce irregular demands on power, thus rendering the drill bit as a driver of drill string vibrations.

Additionally, the rotating drill string causes gyrations of the bottom hole assemblies above the drill bit which are transmitted to the bit in the form of load and torque variations. Thus, the drill string itself induces irregular power into the bit and thereby becomes the driver of drill string vibrations. In any event such vibrations cause fatigue forces to develop on the drill string and bit, increasing wear on the system as well as damaging mechanical and electrical components associated with a MWD system.

In order to minimize the effects of vibrational forces on a drill string and associated down hole assemblies, various shock absorbing assemblies have been developed for incorporation in the drill string, usually above the drilling bit, to isolate induced vibration, shock and impact loads from the drill string above the bit. Normally such shock absorbing subassemblies utilize a splined engagement between a mandrel and an elongated body, whereby drilling or rotational torque is transmitted through the splined engagement between the mandrel and the body. The splined section also permits longitudinal movement of the body with respect to the mandrel, to apply impact or longitudinal vibrational loads to a shock absorbing element, such as a spring system, in the subassembly. A shock absorbing subassembly of this type is disclosed in this inventor's U.S. Pat. No. 4,246,765 dated Jan. 27, 1981.

Keeping in mind the dual problems of dampening vibrations in a drill string to prevent fatigue to the drilling and instrumentation hardware in a drilling system and the need for a reliable downhole power supply, it is an object of the present invention to provide a new and improved downhole assembly for absorbing at least a portion of the vibrational energy occurring on a drill string and converting such absorbed energy into electrical energy to power downhole electrical devices.

SUMMARY OF THE INVENTION

With this and other objects in view, the present invention contemplates apparatus for use in a drill string operating in a borehole including a body portion and mandrel portion of a subassembly arranged for longitudinal movement relative to one another and having threaded end portions for assembly in a drill string. The mandrel and body portions are telescopically arranged to provide an annular chamber between which houses an energy absorbing mechanism. Matingly engaging splines on the mandrel and body portions respectively, permit rotational torque to be transmitted between the mandrel and body portions for transmitting unidirectional rotational motion through the drill string. The energy absorbing mechanism housed between the respective portions has means for converting vibrational motion into electrical energy. This electrical energy is then transmitted in usuable form to an electrically operated device.

One aspect of the invention resides in the use of a piezoelectric device as the energy absorbing mechanism and as the means for converting vibrational energy, in the form of cyclic motion, into electrical energy. Such piezoelectric device may be in the form of a stack of piezoelectric elements arranged in an electrically additive configuration. The output of the piezoelectric device may also be rectified and filtered to provide a usuable form of electrical energy to the using electrical apparatus.

BRIEF DESCRIPTION OF THE DRAWINGS

FIG. 1 is a schematic elevational view of a drill string incorporating a telemetry system including an energy absorbing and power generating system in accordance with the present invention;

FIG. 2 is an elevational view in cross section of an energy absorbing and power generating subassembly in accordance with the present invention;

DESCRIPTION OF THE PREFERRED EMBODIMENTS

Figure 3:
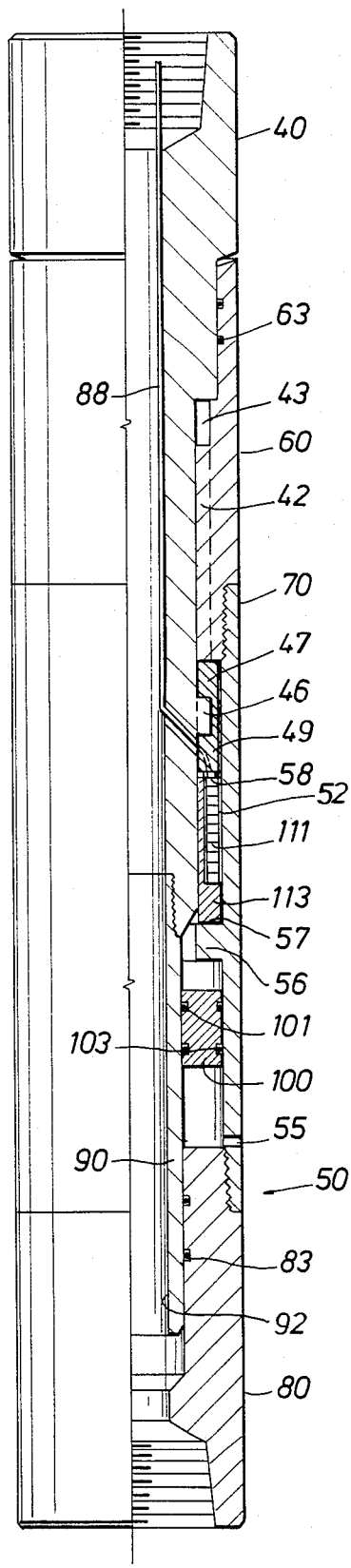
FIG. 3 is an elevational view in cross section of an alternative embodiment of a power generating subassembly.

Referring to FIG. 1 of the drawings, a drill stem 12 is shown suspended in a borehole 13 penetrating earth formations 14. The drill string extends to the surface of the borehole, where it is connected to conventional drilling support apparatus (not shown). The drill string of FIG. 1 includes a bit 16 which may be rotated in the borehole by rotating the drill string or by use of a mud motor, turbine, or the like (not shown) to penetrate into the earth formation. Positioned above the bit is a vibration absorbing and electrical power generating subassembly 17 in accordance with the present invention, which will be described in greater detail with respect to the remaining figures of the drawings. Above the power generating subassembly 17 is a sub 18 for housing electrical controls to modify the output of the power generating sub. Such controls would typically include a rectifier for changing the sinusoidal output of the power generating sub 17 into a direct current. Sub 18 may also include filter and voltage regulator circuits for further modifying the electrical output of the power generator to place such electrical output in a form usable in typical downhole circuitry. The nature of such modifying control circuits will of course depend on the use of the generated electrical power and will be incorporated in the sub 18 accordingly. A sensor subassembly 19 is next positioned in the drill string, typically in a non magnetic drill collar to provide an environment free of magnetic influences in which to operate instruments for measuring borehole parameters or the occurence of events to be telemetered to the surface. Such parameters and events, which it may be desirable to present as real time data at the surface, are too numerous to list fully; however, they would include: bit orientation, bit wear, rotation rate, torque, borehole fluid invasion parameters such as fluid resistivity, formation parameters derived from various formation logging techniques, etc.

A data telemetry system is schematically represented by the sub 21 above the sensors 19 for transmitting data measured by sub 19 to the surface. Such data telemetry may be accomplished by any of the telemetry systems discussed in the background of the invention such as the hardwire telemetry system disclosed in U.S. Pat. No. 3,090,031 to Lord, or an acoustic telemetry system as set forth in U.S. Pat. No. 3,930,220 to Shawhan. In any event, the data telemetry system 21 provides a means for encoding data gathered by the sensors 19 into a transmittable format consistant with the type of telemetry system used, and sending such data uphole by suitable means.

Typically the drill string 12 will include a number of drill collars 22 and intermediate pipe sections (not shown) for adding weight and stiffness to the bottom end of the drill string. Proceeding up the drill string, sections of drill pipe will complete the drill string to the surface, with such sections of pipe normally being approximately 30 or 45 feet in length. Repeater subs 24 may be intermittently stationed in the drill string between sections of pipe, depending on the type of telemetry system in use in the MWD system. Repeaters are typically used in acoustic and electromagnetic telemetry systems as shown in the aforementioned U.S. Pat. No. 3,930,220 and may also be incorporated in a hardwire systems. Such repeater subs are further pertinent to the present invention in that the power generating apparatus disclosed herein may find use as a means for providing electrical power to such repeaters.

Referring next to FIG. 2 of the drawings, the vibration absorbing and power generating subassembly 17 is shown in detail. The subassembly 17 comprises a mandrel 40 and a body 50. Body 50 has a longitudinally extending bore 51 in which mandrel 40 is received, forming an annular chamber 52 between mandrel 40 and body 50.

Mandrel 40 is shown having a threaded box end connection 41 at its upper end for accommodating assemblage of the subassembly in the tool string. Mandrel 40 is prevented from rotating within body 50 by means of a plurality of longitudinally extending splines 45 which are matingly received within longitudinally extending grooves 53 formed on the wall of bore 51 of body 50. Mandrel 40 is also provided with additional splines 46 for cooperation with a split ring 47 and split ring retainer 48. Split ring 47 has a circumferential groove 49 which encloses splines 46 of mandrel 40. Mandrel 40 also includes a removable washpipe 90 threadedly received on the lower end of mandrel 40.

It is seen that mandrel 40 and washpipe 90 are provided with a longitudinally extending bore 92 which allows a suitable drilling mud (not shown) under high pressure to pass downwardly through the drilling string 12, including subassembly 17, and to the bit 16.

Body 50 includes drive sub 60, a main body portion 70, and a bottom sub 80. Drive sub 60 is connected to main body portion 70 by a suitable threaded connection, and bottom sub 80 is likewise connected to main body portion 70 by means of a suitable threaded connection. Bottom sub 80 is provided with internal threads 82 for enabling shock absorbing subassembly 17 to be attached to a suitable tool joint box (not shown). Bottom sub 80 further includes suitable sealing means 83 disposed in interior circumferential grooves of bottom sub 80 for providing a seal between the washpipe 90 of mandrel 40 and bottom sub 80 of body 50. It should be noted that sealing means 83 cooperates with the circumferential outer wall of washpipe 90, and provides for a seal to be effected about the smaller circumference of washpipe 90, rather than about the larger circumference of main mandrel portion 40, thus reducing the amount of hydraulic force action on the mandrel.

Drive sub 60 is provided with interior radial grooves in which sealing means 63 are inserted, thus providing a seal means between mandrel 40 and drive sub 60 of body 50 to seal off annular chamber 52 from the exterior of body 50. Drive sub 60 may further be provided with an oil inspection hole and plug (not shown) to enable annular chamber 52 to be filled with oil, as to be hereinafter described. As previously discussed, drive sub 60 includes the longitudinally extending grooves 53 for cooperation with splines 45 of mandrel 40, whereby mandrel 40 is non-rotatably received in body 50 and allows the transmission of torque to be applied to the subassembly 17 as a rotational force is applied to mandrel 40 via the drill string connected thereabove. Longitudinally extending grooves 53 of drive sub 60 additionally allow a longitudinally sliding engagement between mandrel 40 and body 50, thus limited relative longitudinal movement between mandrel 40 and body 50.

Main body portion 70 is also provided with oil inspection holes and plugs for allowing chamber 52 to be filled with oil as to be hereinafter described, and may also include a plurality of vent holes 55 which communicate with the lower portion of annular chamber 52.

Main body portion 70 is provided with an interior circumferential depending flange 56, the top surface 57 of which forms a load transmitting surface within chamber 52 for transmitting longitudinal thrust loading between mandrel 40 and body 50. Load transmitting surface 57 cooperates with shock absorber element 110, which is disposed between load transmitting surface 57 and its opposed load transmitting surface 58, which is on the lower end of split ring 47 associated with mandrel 40.

The shock absorber element 110 within chamber 52 between opposed load transmitting surfaces 57 and 58 comprises a ring spring assembly 112, thrust ring 113, and spring mandrel 114. The ring springs of ring spring assembly 112 comprise alternating closed out and inner rings with tapered contact surfaces. Spring mandrel 114 provides a means for mounting the ring springs of shock absorber element 110 about mandrel 40, and spring mandrel 114 is slidably mounted about mandrel 40 within annular chamber 52.

Spring mandrel 114 serves the following functions of providing support or stabilization to mandrel 40 in main body portion 70; acts as a centralizer or keeper for the set of ring springs 112; and, in combination with thrust ring 113 and opposed load transmitting surfaces 57 and 58, provides an overload stop, whereby a body 50 slides relative to mandrel 40, thus compressing shock absorber element 110; the maximum amount of compression of shock absorber element 110 is predetermined by the length of spring mandrel 114. Spring mandrel 114 is provided with suitable openings or vents to allow the passage of lubricating oil to fill the entire cavity 52, thus bathing the elements within chamber 52 with oil to lubricate the moving elements therein and to dissipate the effects of heat and friction generated by the compression of the sets of ring springs 112. Thrust ring 113 may likewise be provided with a suitable vent or opening for the same purpose.

Subassembly 17 is provided with a floating seal assembly means 100 in the lower portion of annular chamber 52 for sealing off chamber 52, while still allowing for fluid movement of the lubricating oil in chamber 52 occurring during deflection or relative movement of the mandrel 40 within body 50. The floating seal assembly means 100, or floater, is slidably received between washpipe 90 and main body portion 70, and includes washpipe seals 101 mounted in interior circumferential grooves, and body seals 103 mounted in outer circumferential grooves. Floater 100 may tend to move longitudinally of body 50 with the deflection or relative movement of the mandrel 40 within body 50. The floater 100 also compensates for thermal expansion of the hydraulic fluid, such as oil, within the annular chamber 52 defined between floater 100 and seals 53 between drive sub 60 and mandrel 40.

A top portion of annular chamber 52 above spring mandrel 114 is sized to receive a stack of preassembled piezoelectric elements 111. The piezoelectric assembly 111 will be described in more detail with respect to FIG. 4. The assembly 111 is arranged in the space between spring mandrel 114 and load transmitting surface 58 on the bottom of split ring 47.

To assemble the subassembly 30 of the present invention, washpipe 90 is threadedly connected to mandrel 40. Drive sub 60 of body 50 is then placed onto mandrel 40 with the seals 63 already assembled therein, and with interior grooves 53 of drive sub 60 meshing with splines 45 of mandrel 40. Then split ring 47 is mounted about mandrel 40 with interior groove 49 of split ring 47 enclosing splines 46 of mandrel 40. Split ring retainer ring 48 is then mounted about split ring 47, whereby longitudinal sliding movement of drive sub 60 relative to mandrel 40 is limited. Spring mandrel 114 with the piezoelectric assembly 111 and the set of ring springs 112 is then placed about mandrel 40 and thrust ring 113 is then disposed about the lower portion of mandrel 40. After those elements are in position, main body portion 70 is assembled about mandrel 40 and shock absorber element 110. Main body portion 70 is then threadedly connected to drive sub 60 via threaded connection. Floater 100 is then inserted into main body portion 70 about washpipe 90. Bottom sub 80, with seals 83 already assembled therein, may then be threadedly connected to main body portion 70 via its threaded connection, whereby it is in sliding contact with washpipe 90 of mandrel 40. The subassembly is then filled with oil through the oil plug in drive sub 60 (not shown), and after the subassembly is filled with oil, a vacuum may be applied via the oil plug to ensure that all entrapped air has been removed from chamber 52, and that the chamber 52 is completely filled with oil. The shock absorber element 110 may be provided with a preloaded assembly.

Referring next to FIG. 3 of the drawings, a power generator device, arranged similarly to the subassembly described in detail with respect to FIG. 2, is shown without the provision of the shock absorbing element 110. Instead, the subassembly has been shortened to include the piezoelectric stack 111 arranged between the thrust ring 114 and load transmitting surface 58 on the bottom end of split ring 47. Thrust ring 113 is arranged to rest directly on top of flange 56 thus eliminating that portion of chamber 52 of FIG. 2 for housing the shock absorbing element 110. As in FIG. 2, mandrel 40 is telescopically received within body 50. Mandrel 40 has washpipe portion 90 extending downwardly from its lower end, and bore 92 within the mandrel to provide a mud circulation passage in the drill string. Body 50 includes drive sub 60, main body portion 70, and bottom sub 80 all threadedly connected to one another to comprise the body 50. Drive sub 60 is provided with interior sealing means 63 to provide a sliding sealing surface between drive sub 60 of body 50, and mandrel 40, to seal off the upper end of annular chamber 52.

Drive sub 60 also includes an arrangement of grooves 42 for matingly engaging splines 43 on the mandrel 40. The arrangement of grooves and splines in FIG. 3 may be longitudinally arranged as in FIG. 2 to permit relative longitudinal movement between the mandrel 40 and body 50 or alternatively, they may be helically arranged to permit both longitudinal and rotational relative movement between mandrel 40 and body 50. Also to facilitate such rotational and longitudinal movement, coarse multiple lead threads may be employed between the mandrel and body. Such an arrangement will permit the transmission of torque as well as longitudinal forces when the load bearing surfaces of the assembly are fully engaged while permitting vibrational motion of both a rotational and longitudinal nature to be absorbed by the piezoelectric stack 111 arranged between the load bearing surfaces. The main body portion 70 is again provided with oil inspection holes and plugs (not shown) for filling chamber 52 with oil. Vent holes 55 are also provided in body 70 to communicate with the lower portion of chamber 52. The top surface 57 of flange 56 forms a load transmitting surface for transmitting longitudinal thrust loading between mandrel 40 and body 50. Load transmitting surface 57 cooperates with thrust ring 113 and piezoelectric stack 111 which are disposed between surfaces 57 and its opposed load transmitting surface 58.

Figure 4:
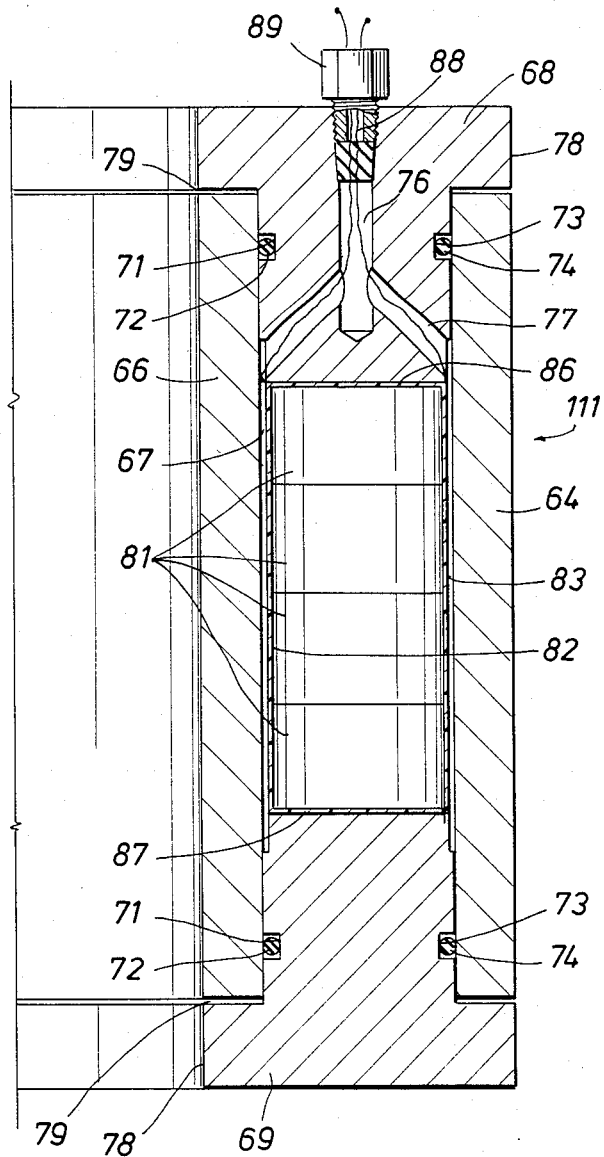
FIG. 4 is an enlarged partial cross sectional view in elevation of a piezoelectric device for converting cyclic mechanical energy into electrical energy.

Floating seal assembly 100 is also again disposed in the lower portion of chamber 52 for sealing of the lower end of the chamber and at the same time allowing movement of oil in chamber 52. Seal assembly 100 also allows for thermal expansion of the hydraulic fluid in annular chamber 52. The assembly of the parts in FIG. 3 is similar to that described with respect to FIG. 2. Referring next to FIG. 4 of the drawings the piezoelectric evice 111 is shown in detail as being in the form of a cylinder comprising an outer cylindrical housing 64 and inner cylindrical housing 66 spaced inwardly from the outer housing 64 to form an annular chamber 67. The upper and lower ends of chamber 67 are covered by top and bottom end caps 68 and 69 respectively. An inner peripheral groove 71 is formed in the side wall of the upper and lower end cap 68 and 69 for receiving circular O-ring seals 72. Likewise, a peripheral groove 73 is formed on the outer side wall of each of the end caps 68 and 69 for receiving circular O-ring seals 74. The seals 72 and 74 are arranged between the end caps and inner and outer housing 66, 64 respectively to provide a fluid tight environment within the chamber 67. Upper end cap 68 is provided with vertical and radial passageways 76, 77 respectively, connecting the exterior of the end caps with the interior of chamber 67. Each of the end caps has a radially extending outer flange portion 78. When the end cap is assembled on the inner and outer housings 66, 64, a longitudinal clearance 79 is provided between the flange portion 78 and the ends of cylindrical housing 66 and 64. This clearance permits compressive loads to be transmitted from the end caps to piezoelectric cylindrical element 81 which are stacked adjacent one another within the chamber 67, between top and bottom end caps 68 and 69. The seals 72 and 73 permit relative longitudinal movement between the end caps and housings while maintaining a fluid sealed environment. Although four piezoelectric cylinders are shown comprising the stack of FIG. 4, it is readily appreciated that any number of cylinders can be arranged in such a configuration to comprise a stack. In this respect, the cylindrical shape of piezoelectric elements is choosen to provide a high density ratio of piezoelectric material to space available in the confining environment of a borehole sub. Other geometrical configurations of piezoelectric elements and arrangement of stacks may be employed to accommodate specific considerations. One such alternative arrangement of piezoelectric elements is shown in a co-pending U.S. patent application filed on the same date of this application.

An inner insulating cylinder 82 constructed of a suitable insulating material is arranged between the inner cylindrical wall portions of the piezoelectric elements 81 and the outer wall of inner cylindrical housing 66. Similarly, an outer insulating cylinder 83 is arranged between the outer wall portions of the piezoelectric elements 81 and the inner wall of outer cylindrical housing 64. To completely insulate the piezoelectric stack of elements 81 from the sealed housing confines, top and bottom insulating discs 86 and 87, of a circular configuration, are positioned between the end caps and the top and bottom of the piezoelectric stack respectively.

Conductor wires 88 extend from the top and bottom surfaces of each of the piezoelectric elements 81 and are connected in parallel or series-parallel configuration to provide an appropriate additive value of voltage or current to facilitate the particular usage of generated electrical energy in the downhole systems. The conductors 88 are arranged to extend through a plug 89 which seals about the conductors and within the upper end of passage 76, to maintain the sealed integrity of inner chamber 67. In this respect the split ring 47 (FIGS. 2 and 3) may have an appropriate cavity formed therein to facilitate the upward extension of the plug 89 therein and the passage of conductors 88 for connection with the electrical control sub 18 positioned above the vibration absorbing and power generating sub 17.

Figure 5:
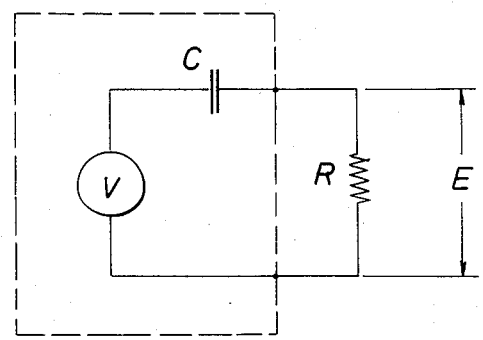
FIG. 5 is a schematic electrical equivalent circuit of a piezoelectric element.

The principle of operation of the stack of piezoelectric elements 81 as described with respect to FIG. 4 may be explained by considering the behavior of a single piezoelectric disc of area A, thickness T, and specified physical properties. The disc is exposed to a sinusoidal pressure P at angular frequency w. Using a simplified equivalent circuit shown inside the dotted lines of FIG. 5 of the drawings, one can compute the power delivered to a load resistance R when the open circuit voltage generated is V and the piezoelectric disc capacitance is C. The potential across the load resistance is E. Power delivered to load R equals $$\frac{V^2}{R} \times \frac{(wRC)^2}{1 + (wRC)^2} = \frac{E^2}{R}$$

where $V = pg_{33}t$. $g_{33}$ is a constant of the material. There are a number of parameters which can be adjusted to optimize the use of such a device according to the requirements for power and available physical space. With respect to pressure, the open circuit voltage V increases linearly with the driving pressure and the power in turn increases as $p^2$. Increasing the frequency w will permit a proportionate decrease in C, thereby reducing the total volume of piezoelectric material to achieve the same value of wRC. As the dielectric constant of the piezoelectric material increases, a smaller volume (total area at given thickness) of piezoelectric material is required to achieve a given value of C. Increasing the pressure constant $g_{33}$ has the same effect as increasing pressure. A monolithic layered structure can be built to reduce the volume of piezoelectric material for a given value of C. The limit on thickness reduction may be governed by minimum voltage requirements in some situations. For given material properties the open circuit voltage is controlled by the disc thickness in the FIG. 4 configuration and the overall impedance of the piezoelectric generator is controlled by the number of discs. Many of the design considerations of a piezoelectric stack are covered in detail in U.S. Pat. No. 4,011,474.

In the operation of the apparatus described above, the drill string 12 including the subassembly 17 and bit 16 are caused to rotate through the earth formations 14 to drill to a desired depth. As drilling progresses, various loads and shocks, including those of a vibrational nature, are passed along the drill string, tending to emanate primarily upwardly from the bit through the bottom sub 80 of body 50. These forces are thus transmitted to the main body portion 70 which will be forced upwardly with respect to mandrel 40. In any event whether such forces originate from above or below the sub 17, the relative forces on the sub will cause the mandrel 40 and body 50 to telescope into an alternating open and closed configuration. By means of opposed load transmitting surface 57 on the main body portion 70; and surface 58 of split ring 47, associated with mandrel 40, the longitudinal and/or rotational forces on the drill string will compress absorber element 110 and/or piezoelectric stack 111 to dampen such forces and at the same time generate electrical energy caused by deformation of the elements 81 in the piezoelectric stack 111. At the same time, the required longitudinal loads and rotational forces, necessary to the drilling operation, are transmitted through the sub 17 to the drill bit 16 by means of the engagement of splines 45 on mandrel 40 with interior grooves 53 on drive sub 60. In the embodiment of FIG. 3 involving helical or coarse multiple lead threads, such transfer of drilling forces is accommodated by splines 43 and grooves 42 respectively.

The electrical output of the piezoelectric stack 111 is passed by means of conductors 88 to sub 18 where the output is modified appropriately to be useful in the using electrical device or circuit. For example, the output can be rectified to change the sinusoidal nature of the direct output of the piezoelectric elements 18 into a direct current. This output may also be filtered and regulated, to further refine and stabilize its form for subsequent use in electrical devices.

While particular embodiments of the present invention have been shown and described, it is apparent that changes and modifications may be made without departing from this invention in its broader aspects and it is therefore the aim in the appended claims to cover all such changes and modifications as fall within the true spirit and scope of this invention.

I claim:

1. In a drill string apparatus operating in a borehole, means for absorbing mechanical energy from the drill string and converting such energy into electrical energy to supply power to downhole electrical circuits, which means comprises:

first longitudinal housing means arranged for connection in a drill string;

second longitudinal housing meanns arranged for connection in the drill string adjacent said first longitudinal housing means;

said first and second longitudinal housing means having first and second portions respectively arranged for movement relative to one another;

energy absorbing means positioned between said first and second portions, said energy absorbing means being arranged to transmit unidirectional energy from one of said portions to the other of said portions while absorbing a portion of the oscillating rotational and longitudinal energy passing between said portions; and means for converting a portion of the oscillating rotational and longitudinal energy into electrical energy.

2. The apparatus of claim 1 wherein said energy converting means includes piezoelectric means deformable in response to the energy absorbed by said energy absorbing means to produce electrical energy.

3. The apparatus of claim 1 wherein said first and second portions have first and second concentrically overlapping members between which said energy absorbing means is arranged.

4. The apparatus of claim 3 wherein said overlapping members form an annular chamber therebetween for housing said energy absorbing means.

5. The apparatus of claim 3 wherein interfitting splines are formed on said overlapping members for transmitting torque from one of said overlapping members to the other.

6. The apparatus of claim 2 wherein said piezoelectric means includes a plurality of piezoelectric elements arranged in an electrically additive configuration to provide electrical power in a sufficient quantity to operate downhole electrical circuits.

7. The apparatus of claim 6 wherein said piezoelectric elements are cylindrical members made from a piezoelectric material.

8. Apparatus useful in a drill string operating in a borehole for generating electrical energy downhole suitable for operating downhole electrical circuits, comprising:

housing means capable of being connected in a drill string, said housing means having first and second portions movable relative to one another;

means for converting relative oscillating rotational and longitudinal motion between said first and second portions into electrical energy; and means for transmitting to said converting means said relative oscillating rotational and longitudinal motion between said first and second portions.

9. The apparatus of claim 8 wherein said energy converting means comprises piezoelectric means deformable in response to the relative oscillating rotational and longitudinal motion between said first and second portions.

10. The apparatus of claim 9 and further including annular chamber means formed between said first and second portions for housing said piezoelectric means.

11. The apparatus of claim 9 wherein said relative motion transmitting means includes a sloping radially curved shoulder means on each of said first and second portions for permitting simultaneous rotational and longitudinal relative motion between said first and second portions.

12. The apparatus of claim 11 wherein said relative motion transmitting means comprises helical splines.

13. The apparatus of claim 11 wherein said relative motion transmitting means comprises coarse multiple lead threads.

14. The apparatus of claim 9 wherein said piezoelectric means and relative motion transmitting means are arranged to transmit unidirectional rotational and longitudinal relative motion between said first and second portions while absorbing at least a portion of the oscillatory motion between said first and second portions.

15. The apparatus of claim 9 wherein said piezoelectric means is comprised of a plurality of piezoelectric elements arranged in an electrically additive configuration.

16. The apparatus of claim 8 wherein said relative motion transmitting means comprises energy absorbing means positioned between said first and second portions, said energy absorbing means being arranged to transmit unidirectional motion from one of said portions to the other of said portions while absorbing a portion of the rotational and longitudinal energy passed between said portions.

17. The apparatus of claim 16 wherein said energy converting means comprises piezoelectric means deformable in response to the energy absorbed by said energy absorbing means.

18. Apparatus for use in a drill string operating in a borehole, comprising:
means for converting oscillating rotational and longitudinal motion occurring in said drill string into electrical energy;
downhole electrically operated means; and
means for transmitting said electrical energy to said downhole electrically operated means.

19. The apparatus of claim 18 wherein said energy converting means comprise piezoelectric means deformable in response to said oscillating rotational and longitudinal motion.

20. The apparatus of claim 18 further comprising energy absorbing means for absorbing fatigue producing vibratory motion occurring in said drill string.

21. The apparatus of claim 20 further comprising means for transmitting unidirectional motion through said drill string and for transmitting said oscillatory rotational and longitudinal motion to said energy converting means and said vibratory motion to said energy absorbing means.

22. The apparatus of claim 20 wherein said energy converting means and said energy absorbing means comprise piezoelectric means deformable in response to said oscillating rotational and longitudinal motion and said vibratory motion.

* * * * *